(12) United States Patent
Kamino et al.

(10) Patent No.: US 11,167,176 B2
(45) Date of Patent: Nov. 9, 2021

(54) GOLF BALL

(71) Applicant: Sumitomo Rubber Industries, Ltd., Kobe (JP)

(72) Inventors: Kazuya Kamino, Kobe (JP); Hidetaka Inoue, Kobe (JP); Kuniyasu Horiuchi, Kobe (JP); Kuniyuki Nishikawa, Osaka (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 16/858,266

(22) Filed: Apr. 24, 2020

(65) Prior Publication Data

US 2020/0338397 A1    Oct. 29, 2020

(30) Foreign Application Priority Data

Apr. 26, 2019 (JP) .............................. JP2019-086325
Apr. 26, 2019 (JP) .............................. JP2019-086326

(51) Int. Cl.
    *A63B 37/06*    (2006.01)
    *A63B 37/00*    (2006.01)
    *C09D 175/04*   (2006.01)

(52) U.S. Cl.
    CPC ...... *A63B 37/0022* (2013.01); *A63B 37/0096* (2013.01); *C09D 175/04* (2013.01)

(58) Field of Classification Search
    CPC .................................................. A63B 37/0022
    USPC ........................................................ 473/378
    See application file for complete search history.

(56) References Cited

U.S. PATENT DOCUMENTS

| | | | |
|---|---|---|---|
| 5,725,443 A | 3/1998 | Sugimoto et al. | |
| 5,919,851 A * | 7/1999 | Yamaguchi | C09D 7/47 524/268 |
| 7,807,752 B2 * | 10/2010 | Masutani | C08G 65/007 525/104 |
| 10,463,919 B2 | 11/2019 | Shinohara et al. | |
| 2017/0165527 A1 * | 6/2017 | Inoue | C09D 175/08 |
| 2017/0173398 A1 | 6/2017 | Tachibana et al. | |
| 2017/0340922 A1 * | 11/2017 | Inoue | C08G 18/4202 |
| 2019/0001193 A1 | 1/2019 | Shinohara et al. | |
| 2019/0091517 A1 | 3/2019 | Inoue et al. | |

FOREIGN PATENT DOCUMENTS

| | | |
|---|---|---|
| EP | 3603755 A1 | 2/2020 |
| JP | 5-269221 A | 10/1993 |
| JP | 8-117361 A | 5/1996 |

(Continued)

OTHER PUBLICATIONS

Extended European Search Report for European Application No. 20163385.6, dated Sep. 10, 2020.

*Primary Examiner* — Raeann Gorden
(74) *Attorney, Agent, or Firm* — Birch, Stewart, Kolasch & Birch, LLP (57) ABSTRACT

An object of the present invention is to provide a golf ball travelling a great flight distance on driver shots on a rainy day and having excellent spin performance on approach shots. The present invention provides a golf ball comprising a golf ball body and a paint film covering the golf ball body and composed of at least one layer, wherein an outermost layer of the paint film is formed from a paint containing a polyol, a polyisocyanate, and a carbinol modified silicone oil different from the polyol compound.

19 Claims, 1 Drawing Sheet

(56) References Cited

FOREIGN PATENT DOCUMENTS

| | | | |
|---|---|---|---|
| JP | 2001-214131 | A | 8/2001 |
| JP | 2017-99804 | A | 6/2017 |
| JP | 2019-10190 | A | 1/2019 |
| JP | 2019-10191 | A | 1/2019 |

\* cited by examiner

GOLF BALL

FIELD OF THE INVENTION

The present invention relates to a golf ball having a paint film.

DESCRIPTION OF THE RELATED ART

Conventionally, a golf ball has a paint film formed on a surface of a golf ball body. This paint film contributes the performance, quality, appearance or the like of the golf ball. It has been proposed to blend a polysiloxane compound in a paint for forming the paint film.

For examples, Japanese Patent Publication No. H5-269221 A discloses a golf ball having a paint film as an outermost layer, wherein the paint film is formed from a urethane-based paint containing 0.01 to 0.5 wt % of a hydroxy group-containing organically modified polysiloxane with respect to 100 wt % of a resin component in the paint. Japanese Patent Publication No. H8-117361 A discloses a painted golf ball composed of a golf ball body and a paint film applied to the body, wherein the paint film is formed from at least a urethane-based or acrylic-based paint, and an isocyanate group-containing organically modified polysiloxane in the paint is contained in an amount of 0.1 to 20 wt % with respect to a resin component in the paint.

Further, Japanese Patent Publication No. 2001-214131 A discloses a golf ball clear paint containing an organosilicon compound, wherein a urethane resin contained in the clear paint is (1) a silicone modified urethane resin A obtained by a reaction between an isocyanate and a polyol wherein at least either of the isocyanate and the polyol is modified with an organosilicon compound; (2) a silicone modified urethane resin B obtained by a reaction among an polyol, an isocyanate and an organosilicon compound; or (3) a silicone modified urethane resin C obtained by a reaction between an acrylated urethane resin and an organosilicon compound.

In addition, it has also been proposed to impart water repellency to the paint film of the golf ball to suppress adhesion of water on the golf ball surface when the golf ball is used on a rainy day or the like. For example, Japanese Patent Publication No. 2019-10190 A discloses a golf ball comprising a core, a cover formed on an outer side of the core and having dimples formed thereon, and an outer surface layer formed on an outer side of the cover and formed from a material having a contact angle of 90° or more, wherein the golf ball has a dynamic friction coefficient of 0.52 or more.

Further, Japanese Patent Publication No. 2019-10191 A discloses a golf ball comprising a core, a cover formed on an outer side of the core and having dimples formed thereon, and an outer surface layer formed on an outer side of the cover and formed from a material having a contact angle of 90° or more and a dynamic contact angle of 85° or less.

SUMMARY OF THE INVENTION

Conventionally, a method of blending a polysiloxane compound in a paint for forming the paint film of the golf ball surface, and a method of increasing water repellency of the golf ball surface have been proposed. However, such golf ball tends to have lowered spin performance on approach shots. The present invention has been achieved in view of the above problems. An object of the present invention is to provide a golf ball having an improved flight distance on driver shots on a rainy day while maintaining spin performance on approach shots, by controlling the paint film composition.

In the first preferable embodiment, the present invention provides a golf ball comprising a golf ball body and a paint film covering the golf ball body and composed of at least one layer, wherein an outermost layer of the paint film is formed from a paint containing a polyol, a polyisocyanate and a carbinol modified silicone oil. If the outermost layer of the paint film is formed from the paint containing the polyol, the polyisocyanate and the carbinol modified silicone oil, the water repellency of the outermost layer of the paint film improves, and the flight distance on driver shots on a rainy day improves. Further, if the outermost layer of the paint film contains the specific components, the spin performance on approach shots is also better.

In the second preferable embodiment, the present invention provides a golf ball comprising a golf ball body and a paint film covering the golf ball body and composed of at least one layer, wherein an outermost layer of the paint film is formed from a paint containing a polyol, a polyisocyanate and a silicone compound, and the outermost layer of the paint film has a surface having a water sliding angle of less than 50° and a dynamic friction coefficient of from 0.3 to 0.9. If the outermost layer of the paint film is formed from the paint containing the polyol, the polyisocyanate and the silicone compound, and has the predetermined water sliding angle, the water repellency of the outermost layer of the paint film improves, the flight distance on driver shots on a rainy day improves. Further, if the outermost layer of the paint film has the predetermined dynamic friction coefficient, the spin performance on approach shots is also better.

According to the present invention, a golf ball having excellent flight distance on driver shots on a rainy day, and excellent spin performance on approach shots, is obtained.

DESCRIPTION OF THE PREFERRED EMBODIMENT

Figure 1:
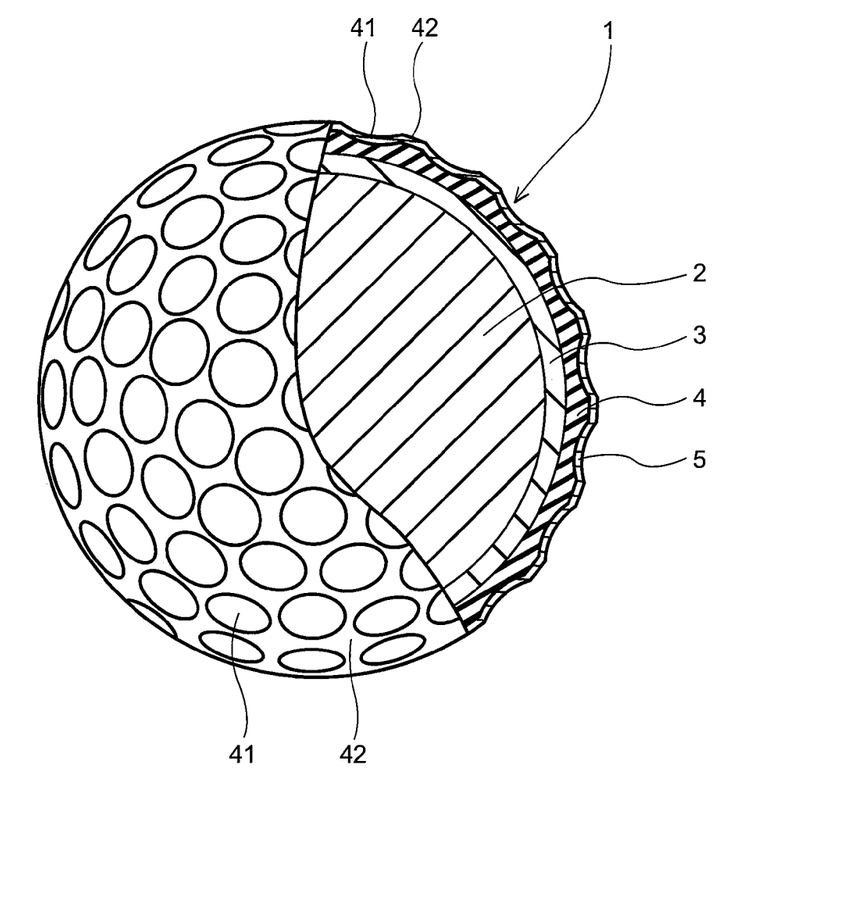
The FIGURE is a partially cutaway sectional view showing a golf ball according to an embodiment of the present invention.

In the first preferable embodiment, the present invention provides a golf ball comprising a golf ball body and a paint film covering the golf ball body and composed of at least one layer, wherein an outermost layer of the paint film is formed from a paint containing a polyol, a polyisocyanate, and a carbinol modified silicone oil different from the polyol compound. If the outermost layer of the paint film is formed from the paint containing the polyol, the polyisocyanate, and the carbinol modified silicone oil different from the polyol, the water repellency of the outermost layer of the paint film improves, and thus water hardly adheres to the golf ball surface on a rainy day. Further, even if in a state that water is present on the golf ball surface, water on the surface can be rapidly removed by hitting. Thus, the flight distance on driver shots on a rainy day improves. Further, if the outermost layer of the paint film contains the above components, the spin performance on approach shots is also better.

In the first preferable embodiment, the paint film may have a single layered construction or multiple layered construction. The outermost layer of the paint film, which is located at the outermost layer of the golf ball, is formed from the outermost layer paint containing the carbinol modified silicone oil. When the paint film has a single layered construction, the single layered paint film is formed from the outermost layer paint containing the carbinol modified silicone oil. When the paint film has the multiple layered construction, at least the outermost layer of the paint film is formed from the outermost layer paint containing the carbinol modified silicone oil.

In the second preferable embodiment, the present invention provides a golf ball comprising a golf ball body and a paint film covering the golf ball body and composed of at least one layer, wherein an outermost layer of the paint film is formed from a paint (hereinafter sometimes referred to as "outermost layer paint".) containing a polyol, a polyisocyanate and a silicone compound, and the outermost layer of the paint film has a surface having a water sliding angle of less than 50° and a dynamic friction coefficient of from 0.3 to 0.9. If the outermost layer of the paint film has the predetermined water sliding angle, the water repellency of the outermost layer of the paint film improves, and thus water hardly adheres to the golf ball surface on a rainy day. Further, even if in a state that water is present on the golf ball surface, water on the surface can be rapidly removed by hitting. Thus, the flight distance on driver shots on a rainy day improves. Further, if the outermost layer of the paint film has the predetermined dynamic friction coefficient, the spin performance on approach shots is also better.

In the second preferable embodiment, the above paint film may have a single layered construction or multiple layered construction. The outermost layer of the paint film, which is located at the outermost layer of the golf ball, is formed from the outermost layer paint, and has the predetermined water sliding angle and dynamic friction coefficient. When the paint film has the single layered construction, the single layered paint film is formed from the outermost layer paint, and has the predetermined water sliding angle and dynamic friction coefficient. When the paint film has the multiple layered construction, at least the outermost layer of the paint film is formed from the outermost layer paint, and has the predetermined water sliding angle and dynamic friction coefficient.

(Outermost Layer Paint)

The outermost layer paint contains the polyol, the polyisocyanate and the silicone compound. Examples of the outermost layer paint include a so-called two-component curing type urethane paint including a polyol composition containing a polyol, as a base material, and a polyisocyanate composition containing a polyisocyanate, as a curing agent. It is noted that the silicone compound may be blended in either the polyol composition or the polyisocyanate composition.

(Polyol Composition)

The polyol composition contains a polyol. Examples of the polyol include a compound having two or more hydroxy groups in the molecule. Examples of the polyol include a compound having a hydroxy group at a terminal of the molecule, and a compound having a hydroxy group at a position other than the terminal of the molecule. The polyol may be used solely, or a mixture of at least two of them may be used. The polyol contained in the polyol composition preferably does not have a polysiloxane structure. It is noted that the carbinol modified silicone oil which will be described later is not included in the polyol in the present invention.

Examples of the compound having the hydroxy group at the terminal of the molecule include a low molecular weight polyol having a molecular weight of less than 500, and a high molecular weight polyol having a number average molecular weight of 500 or more. Examples of the low molecular weight polyol include a diol such as ethylene glycol, diethylene glycol, triethylene glycol, 1,3-butanediol, 1,4-butanediol, neopentyl glycol, and 1,6-hexanediol; and a triol such as glycerin, trimethylolpropane, and hexanetriol. Examples of the high molecular weight polyol include a polyether polyol, a polyester polyol, a polycaprolactone polyol, a polycarbonate polyol, a urethane polyol, and an acrylic polyol. Examples of the polyether polyol include polyoxyethylene glycol (PEG), polyoxypropylene glycol (PPG), and polyoxytetramethylene glycol (PTMG). Examples of the polyester polyol include polyethylene adipate (PEA), polybutylene adipate (PBA), and polyhexamethylene adipate (PHMA). Examples of the polycaprolactone polyol include poly-ε-caprolactone (PCL). Examples of the polycarbonate polyol include polyhexamethylene carbonate.

The urethane polyol is a compound having a plurality of urethane bonds in its molecule, and having at least two hydroxyl groups in one molecule thereof. Examples of the urethane polyol include a urethane prepolymer obtained by a reaction between a first polyol component and a first polyisocyanate component under a condition that the amount of the hydroxyl group included in the first polyol component is excessive to the amount of the isocyanate group included in the first polyisocyanate component.

Examples of the first polyol component of the urethane polyol include a polyether diol, a polyester diol, a polycaprolactone diol, and a polycarbonate diol, and the polyether diol is preferable. Examples of the polyether diol include polyoxyethylene glycol, polyoxypropylene glycol, and polyoxytetramethylene glycol, and among them, polyoxytetramethylene glycol is preferable.

The number average molecular weight of the polyether diol is preferably 500 or more, more preferably 600 or more, and is preferably 4,000 or less, more preferably 3,500 or less, and even more preferably 3,000 or less. If the number average molecular weight of the polyether diol is 500 or more, the distance between the crosslinking points in the paint film is long, the paint film is soft, and thus the spin performance is enhanced. If the number average molecular weight of the polyether diol is 4,000 or less, the distance between the crosslinking points in the paint film is not excessively long, and thus the paint film has better stain resistance. It is noted that the number average molecular weight of the polyol component can be measured, for example, by gel permeation chromatography (GPC) using polystyrene as a standard substance, tetrahydrofuran as an eluent, and an organic solvent system GPC column (e.g., "Shodex (registered trademark) KF series" available from Showa Denko K.K.) as a column.

The first polyol component may contain a low molecular weight polyol having a molecular weight of less than 500. Examples of the low molecular weight polyol include a diol such as ethylene glycol, diethylene glycol, triethylene glycol, 1,3-butanediol, 1,4-butanediol, neopentyl glycol, and 1,6-hexanediol; and a triol such as glycerin, trimethylolpropane, and hexanetriol. The low molecular weight polyol may be used solely, or a mixture of at least two of them may be used.

The first polyol component of the urethane polyol preferably contains the triol component and the diol component. The triol component is preferably trimethylolpropane. The mixing ratio (triol component/diol component) of the triol component to the diol component is preferably 0.2 or more, more preferably 0.5 or more, and is preferably 6.0 or less, more preferably 5.0 or less in a mass ratio.

The first polyisocyanate component constituting the urethane polyol is not particularly limited, as long as it has two or more isocyanate groups. Examples of the first polyisocyanate component include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI), and para-phenylene diisocyanate (PPDI); and an alicyclic polyisocyanate or aliphatic polyisocyanate such as 4,4'-dicyclohexylmethane diisocyanate ($H_{12}$MDI), hydrogenated xylylene diisocyanate ($H_6$XDI), hexamethylene diisocyanate (HDI), isophorone diisocyanate (IPDI), and norbornene diisocyanate (NBDI). These polyisocyanates may be used solely, or at least two of them may be used in combination.

The amount of the polyether diol in the urethane polyol is preferably 30 mass % or more, more preferably 35 mass % or more, and even more preferably 40 mass % or more. The polyether diol forms the soft segment in the paint film. Thus, if the amount of the polyether diol is 30 mass % or more, the obtained golf ball has further enhanced spin performance.

The weight average molecular weight of the urethane polyol is preferably 5,000 or more, more preferably 5,300 or more, and even more preferably 5,500 or more, and is preferably 20,000 or less, more preferably 18,000 or less, and even more preferably 16,000 or less. If the weight average molecular weight of the urethane polyol is 5,000 or more, the distance between the crosslinking points in the paint film is long, the paint film becomes soft, and thus the spin performance is enhanced. If the weight average molecular weight of the urethane polyol is 20,000 or less, the distance between the crosslinking points in the paint film is not excessively long, and thus the paint film has better stain resistance.

The hydroxyl value of the urethane polyol is preferably 10 mgKOH/g or more, more preferably 15 mgKOH/g or more, and even more preferably 20 mgKOH/g or more, and is preferably 200 mgKOH/g or less, more preferably 190 mgKOH/g or less, and even more preferably 180 mgKOH/g or less. It is noted that the hydroxyl value can be measured according to JIS K 1557-1, for example, by an acetylation method.

Examples of the compound having the hydroxy group at the position other than the terminal of the molecule include a polyrotaxane having a hydroxy group, and a hydroxy group modified vinyl chloride-vinyl acetate copolymer.

The polyrotaxane having the hydroxy group has a cyclic molecule having at least one hydroxy group, and a linear molecule piercing through the cycle of the cyclic molecule so that the cyclic molecule is movable along and rotatable around the linear molecule. The above polyrotaxane has blocking groups at both terminals of the linear molecule to prevent disassociation of the cyclic molecule. It is noted that the above polyrotaxane excludes a psedo-rotaxane having a cyclic molecule dissociable from a linear molecule.

The polyrotaxane having the hydroxy group preferably has a cyclodextrin, a linear molecule piercing through the cyclic structure of the cyclodextrin, and blocking groups located at both terminals of the linear molecule to prevent disassociation of the cyclic molecule. The polyrotaxane is viscoelastic, since the cyclodextrin molecule is movable along the linear molecule that penetrates the cyclodextrin in a skewering manner (pulley effect). Even if a tension is applied to the polyrotaxane, the tension can be uniformly dispersed due to the pulley effect. Thus, the polyrotaxane has an excellent property that a crack or flaw very hardly occurs, unlike a conventional crosslinked polymer.

The cyclodextrin is a general term for an oligosaccharide having a cyclic structure. The cyclodextrin is, for example, a molecule having 6 to 8 D-glucopyranose residues being linked in a cyclic shape via an α-1,4-glucoside bond. Examples of the cyclodextrin include α-cyclodextrin (number of glucose units: 6), β-cyclodextrin (number of glucose units: 7), and γ-cyclodextrin (number of glucose units: 8), and α-cyclodextrin is preferable. As the cyclodextrin, one type may be used solely, and two or more types may be used in combination.

The linear molecule is not particularly limited, as long as it is a linear molecule piercing through the cyclic structure of the cyclodextrin so that the cyclic structure of the cyclodextrin is movable along and rotatable around the linear molecule. Examples of the linear molecule include polyalkylene, polyester, polyether, and polyacrylic acid. Among them, polyether is preferable, polyethylene glycol is particularly preferable. Polyethylene glycol has less steric hindrance, and thus can easily penetrate the cyclic structure of the cyclodextrin in a skewering manner.

The weight average molecular weight of the linear molecule is preferably 5,000 or more, more preferably 6,000 or more, and is preferably 100,000 or less, more preferably 80,000 or less.

The linear molecule preferably has functional groups at both terminals thereof. When the linear molecule has the functional group, the linear molecule can easily react with the blocking group. Examples of the functional group include a hydroxyl group, a carboxyl group, an amino group, and a thiol group.

The blocking group is not particularly limited, as long as it is located at both terminals of the linear molecule to prevent disassociation of the cyclodextrin from the linear molecule. Examples of the method for preventing the disassociation include a method of using a bulky blocking group to physically prevent the disassociation, and a method of using an ionic blocking group to electrostatically prevent the disassociation. Examples of the bulky blocking group include a cyclodextrin and an adamantyl group. The number of the cyclodextrins kept on the linear molecule (kept amount) preferably ranges from 0.06 to 0.61, more preferably ranges from 0.11 to 0.48, and even more preferably ranges from 0.24 to 0.41, when the maximum kept amount thereof is deemed as 1. This is because if the number is less than 0.06, the pulley effect may not be exerted, and if the number exceeds 0.61, the cyclodextrins are very densely located, so that the movability of the cyclodextrin may decrease.

The polyrotaxane is preferably a polyrotaxane having at least a part of hydroxyl groups of the cyclodextrin being modified with a caprolactone chain. Modifying with the caprolactone alleviates the steric hindrance between the polyrotaxane and the polyisocyanate, and thus enhances the reaction efficiency of the polyrotaxane with the polyisocyanate.

As the above modification, for example, the hydroxyl groups of the cyclodextrin are treated with propylene oxide to hydroxypropylate the cyclodextrin, and then ε-caprolactone is added to perform ring-opening polymerization. As a result of this modification, the caprolactone chain —(CO(CH$_2$)$_5$O)nH (n is a natural number of 1 to 100) is linked to the exterior side of the cyclic structure of the cyclodextrin via —O—C$_3$H$_6$—O— group. "n" represents the degree of polymerization, and is preferably a natural number of 1 to 100, more preferably a natural number of 2 to 70, and even more preferably a natural number of 3 to 40. At another terminal of the caprolactone chain, a hydroxyl group is formed through the ring-opening polymerization. The hydroxy group at the terminal of the caprolactone chain can react with the polyisocyanate.

The ratio of the hydroxyl groups modified with the caprolactone chain to all the hydroxyl groups (100 mole %) included in the cyclodextrin before the modification is preferably 2 mole % or more, more preferably 5 mole % or more, and even more preferably 10 mole % or more. If the ratio of the hydroxyl groups modified with the caprolactone chain falls within the above range, the polyrotaxane has greater hydrophobicity, and thus has higher reactivity with the polyisocyanate.

The hydroxyl value of the polyrotaxane is preferably 10 mg KOH/g or more, more preferably 15 mg KOH/g or more, and even more preferably 20 mg KOH/g or more, and is preferably 400 mg KOH/g or less, more preferably 300 mg KOH/g or less, even more preferably 220 mg KOH/g or less, and particularly preferably 180 mg KOH/g or less. If the hydroxyl value of the polyrotaxane falls within the above range, the polyrotaxane has higher reactivity with the polyisocyanate, and thus the paint film has better durability.

The total molecular weight of the polyrotaxane is preferably 30,000 or more, more preferably 40,000 or more, and even more preferably 50,000 or more, and is preferably 3,000,000 or less, more preferably 2,500,000 or less, and even more preferably 2,000,000 or less, in a weight average molecular weight. If the weight average molecular weight is 30,000 or more, the paint film has sufficient strength, and if the weight average molecular weight is 3,000,000 or less, the paint film has sufficient softness and thus the golf ball has enhanced approach performance. It is noted that the weight average molecular weight of the polyrotaxane can be measured, for example, by gel permeation chromatography (GPC) using polystyrene as a standard substance, tetrahydrofuran as an eluent, and an organic solvent system GPC column (e.g., "Shodex (registered trademark) KF series" available from Showa Denko K.K.) as a column.

Specific examples of the polyrotaxane modified with the polycaprolactone include SeRM super polymer SH3400P, SH2400P, and SH1310P available from by Advanced Softmaterials Inc.

The hydroxy group modified vinyl chloride-vinyl acetate copolymer can adjust the adhesion of the paint film while maintaining scuff resistance of the paint film. The hydroxy group modified vinyl chloride-vinyl acetate copolymer can be obtained, for example, by a method of copolymerizing vinyl chloride, vinyl acetate, and a monomer having a hydroxy group (e.g., polyvinyl alcohol, hydroxyalkyl acrylate); and a method of partially or completely saponifying a vinyl chloride-vinyl acetate copolymer.

The amount of the vinyl chloride component in the hydroxy group modified vinyl chloride-vinyl acetate copolymer is preferably 1 mass % or more, more preferably 20 mass % or more, and even more preferably 50 mass % or more, and is preferably 99 mass % or less, more preferably 95 mass % or less. Specific examples of the hydroxy group modified vinyl chloride-vinyl acetate copolymer include Solbin (registered trademark) A, Solbin AL, and Solbin TA3 available from Nissin Chemical Industry Co., Ltd.

Preferable examples of the polyol composition include an embodiment containing the urethane polyol as the polyol compound (first embodiment); and an embodiment containing, as a polyol, the polyrotaxane having the cyclodextrin, the linear molecule piercing through the cyclic structure of the cyclodextrin and the blocking group located at both terminals of the linear molecule to prevent disassociation of the cyclodextrin, wherein at least a part of hydroxyl groups of the cyclodextrin is modified with the caprolactone chain via the —O—$C_3H_6$—O— group (second embodiment).

In the polyol composition according to the first embodiment, the amount of the urethane polyol in the polyol contained in the polyol composition is preferably 60 mass % or more, more preferably 70 mass % or more, and even more preferably 80 mass % or more. The polyol of the polyol composition according to the first embodiment also preferably consists of the urethane polyol.

In the polyol composition according to the second embodiment, the amount of the polyrotaxane in the polyol contained in the polyol composition is preferably 10 mass % or more, more preferably 15 mass % or more, and even more preferably 20 mass % or more, and is preferably 100 mass % or less, more preferably 90 mass % or less, and even more preferably 85 mass % or less.

The polyol composition according to the second embodiment preferably contains the polycaprolactone polyol as the polyol. The mass ratio (polycaprolactone polyol/polyrotaxane) of the polycaprolactone polyol to the polyrotaxane is preferably 0/100 or more, more preferably 5/95 or more, and even more preferably 10/90 or more, and is preferably 90/10 or less, more preferably 85/15 or less, and even more preferably 80/20 or less.

The polyol composition according to the second embodiment preferably contains the hydroxy group modified vinyl chloride-vinyl acetate copolymer as the polyol. The amount of the hydroxy group modified vinyl chloride-vinyl acetate copolymer in the polyol contained in the polyol composition is preferably 4 mass % or more, more preferably 8 mass % or more, and is preferably 50 mass % or less, more preferably 45 mass % or less.

(Polyisocyanate Composition)

Next, the polyisocyanate composition will be explained. The polyisocyanate composition contains a polyisocyanate. Examples of the polyisocyanate include a compound having two or more isocyanate groups.

Examples of the polyisocyanate include an aromatic diisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI), and para-phenylene diisocyanate (PPDI); an alicyclic diisocyanate or aliphatic diisocyanate such as 4,4'-dicyclohexylmethane diisocyanate ($H_{12}$MDI), hydrogenated xylylene diisocyanate ($H_6$XDI), hexamethylene diisocyanate (HDI), isophorone diisocyanate (IPDI), and norbornene diisocyanate (NBDI); and a triisocyanate such as an allophanate product, biuret product, isocyanurate product, and adduct of these diisocyanates. The polyisocyanates may be used solely, or at least two of them may be used in combination.

The allophanate product is, for example, a triisocyanate obtained by further reacting a diisocyanate with a urethane bond formed by a reaction between a diisocyanate and a low molecular weight diol. The adduct is a triisocyanate obtained by a reaction between a diisocyanate and a low molecular weight triol such as trimethylolpropane or glycerin. The biuret product is, for example, a triisocyanate having a biuret bond represented by the following formula (11). The isocyanurate product of the diisocyanate is, for example, a triisocyanate represented by the following formula (12).

(11)

(12)

In the formulae (11) and (12), R represents a residue where isocyanate groups are removed from the diisocyanate.

Preferable examples of the triisocyanate include an isocyanurate product of hexamethylene diisocyanate, a biuret product of hexamethylene diisocyanate, and an isocyanurate product of isophorone diisocyanate.

In the present invention, the polyisocyanate composition preferably contains the triisocyanate. The amount of the triisocyanate in the polyisocyanate contained in the polyisocyanate composition is preferably 50 mass % or more, more preferably 60 mass % or more, and even more preferably 70 mass % or more. The polyisocyanate of the polyisocyanate composition most preferably consists of the triisocyanate.

The amount of the isocyanate group (NCO %) of the polyisocyanate contained in the polyisocyanate composition is preferably 0.5 mass % or more, more preferably 1 mass % or more, and even more preferably 2 mass % or more, and is preferably 45 mass % or less, more preferably 40 mass % or less, and even more preferably 35 mass % or less. It is noted that the amount of the isocyanate group (NCO %) included in the polyisocyanate can be represented by the following expression.

NCO(%)=100×[mole number of the isocyanate group included in the polyisocyanate×42(molecular weight of NCO)]/[total mass (g) of the polyisocyanate]

Specific examples of the polyisocyanate include Burnock D-800, Burnock DN-950, and Burnock DN-955 available from DIC corporation; Desmodur N75MPA/X, Desmodur N3300, Desmodur L75 (C), and Sumidur E21-1 available from Sumika Bayer Urethane Co., Ltd.; Coronate HX and Coronate HK available from Nippon Polyurethane Industry Co., Ltd.; Duranate 24A-100, Duranate 21S-75E, Duranate TPA-100, and Durante TKA-100 available from Asahi Kasei Chemicals Corporation; and VESTANAT T1890 available from Degussa.

The molar ratio (NCO group/OH group) of the isocyanate group (NCO group) included in the polyisocyanate composition to the hydroxyl group (OH group) included in the polyol composition is preferably 0.1 or more, more preferably 0.2 or more. If the molar ratio (NCO group/OH group) is less than 0.1, the curing reaction is not sufficient, and if the molar ratio (NCO group/OH group) is excessively great, the amount of the isocyanate group becomes excessive, and thus the obtained paint film may become hard and fragile, and the appearance thereof may deteriorate. For this reason, the molar ratio (NCO group/OH group) is preferably 1.5 or less, more preferably 1.4 or less, and even more preferably 1.3 or less. It is noted that the reason why the appearance of the obtained paint film deteriorates if the amount of the isocyanate group is excessive in the paint is considered that an excessive amount of the isocyanate group may promote a reaction between the moisture in the air and the isocyanate group, thereby generating a lot of carbon dioxide gas.

In the case that the polyol composition according to the first embodiment is used as the polyol composition, the polyisocyanate composition preferably contains the biuret product of hexamethylene diisocyanate, the isocyanurate product of hexamethylene diisocyanate, and the isocyanurate product of isophorone diisocyanate, as the polyisocyanate. In the case that the biuret product and isocyanurate product of hexamethylene diisocyanate are used in combination, their mixing ratio (biuret product/isocyanurate product) preferably ranges from 20/40 to 40/20, more preferably ranges from 25/35 to 35/25, in a mass ratio.

In the case that the polyol composition according to the second embodiment is used as the polyol composition, the polyisocyanate composition preferably contains the isocyanurate product and/or biuret product of hexamethylene diisocyanate, as the polyisocyanate.

(Silicone Compound)

The outermost layer paint contains a silicone compound different from the polyol, in addition to the polyol and the polyisocyanate. The silicone compound is a component imparting water repellency to the paint film. Examples of the silicone compound include a silicone resin, a silicone oil, a cured product of a curable silicone resin, and a reaction product of a reactive silicone oil. The silicone compound may be used solely, or at least two of them may be used in combination. The silicone resin is a resin composed of a siloxane bond (Si—O—Si), and is a silicone having a three-dimensional structure in the molecule. The silicone oil is a silicone having a linear structure.

(Carbinol Modified Silicone Oil)

The silicone compound preferably includes a carbinol modified silicone oil. The carbinol modified silicone oil may be used solely, or at least two of them may be used in combination. The carbinol modified silicone oil is a silicone oil having at least one carbinol group (—ROH (R is an alkylene group)) introduced in a silicone oil. In the carbinol modified silicone oil, the carbinol group may be introduced at the terminal of the molecular chain, or introduced as a side chain of the molecular chain. The carbinol modified silicone oil preferably has the carbinol group at one or both terminals of the molecular chain.

The carbinol modified silicone oil is preferably a silicone oil represented by the following general formula (1).

(1)

(In the formula (1), $R^1$ represents a substituted or unsubstituted monovalent hydrocarbon group, $R^2$ represents an alkylene group, $R^3$ represents an alkylene group, x presents an integer of 0 to 3, y presents an integer of 0 to 2, z presents an integer of 0 to 600, and a plurality of $R^1$ to $R^3$ may be identical to or different from each other.)

Examples of the unsubstituted monovalent hydrocarbon group represented by the above $R^1$ include an aliphatic hydrocarbon group, and an aromatic hydrocarbon group. A plurality of $R^1$ may be respectively different from or identical to each other.

Examples of the aliphatic hydrocarbon group include an alkyl group. The number of carbon atoms in the alkyl group is preferably 1 or more, and is preferably 18 or less, more preferably 8 or less. The alkyl group may be linear, branched, or cyclic. Examples of the alkyl group include a linear alkyl group such as a methyl group, ethyl group, propyl group, butyl group, pentyl group, hexyl group, heptyl group, octyl group, nonyl group, decyl group, dodecyl group, undecyl group, tridecyl group, tetradecyl group, pentadecyl group, hexadecyl group, heptadecyl group, and octadecyl group; a branched alkyl group such as an isopropyl group, isobutyl group, sec-butyl group, tert-butyl group, isopentyl group, sec-pentyl group, neopentyl group, isooctyl group, 2-ethylhexyl group, and isodecyl group; and a cyclic alkyl group such as a cyclopropyl group, cyclobutyl group, cyclopentyl group, cyclohexyl group, cycloheptyl group, and cyclooctyl group.

Examples of the aromatic hydrocarbon group include an aryl group, an alkylaryl group, and an aralkyl group. The number of carbon atoms in the aromatic hydrocarbon group is preferably 6 or more, and is preferably 18 or less, more preferably 8 or less. Examples of the aryl group include a phenyl group. Examples of the alkylaryl group include a tolyl group and xylyl group. Examples of the aralkyl group include a benzyl group, 1-phenylethyl group, 2-phenylethyl group, and methylbenzyl group.

Examples of the substituted monovalent hydrocarbon group include a group in which at least one hydrogen atom of the unsubstituted monovalent hydrocarbon group is substituted with a substituent group. Examples of the substituent group include a halogen atom (e.g. fluorine, chlorine, bromine, iodine). Examples of the substituted monovalent hydrocarbon group include a halogenated alkyl group such as a 3,3,3-trifluoropropyl group.

The above $R^1$ is preferably the hydrogen atom, or the unsubstituted monovalent hydrocarbon group, more preferably the aliphatic hydrocarbon group having 1 to 18 carbon atoms, or the aromatic hydrocarbon group having 6 to 8 carbon atoms, and the hydrogen atom, methyl group, phenyl group are particularly suitable.

The number of carbon atoms in the alkylene group represented by the above $R^2$ or $R^3$ is preferably 1 or more, and is preferably 18 or less, more preferably 8 or less. Examples of the alkylene group include methylene group, ethylene group, trimethylene group, tetramethylene group, and pentamethylene group.

The above x is preferably 2 or 3. The above y is preferably 2. The above z is preferably 0 or more, more preferably 1 or more, and even more preferably 5 or more, and is preferably 600 or less, more preferably 400 or less, and even more preferably 250 or less.

The carbinol modified silicone oil is preferably a silicone oil represented by the following general formula (2).

(In the formula (2), $R^4$ represents a substituted or unsubstituted monovalent hydrocarbon group, $R^5$ represents an alkylene group, 'm' is an integer of 0 to 2, 'n' is an integer of 0 to 600, and a plurality of $R^4$ and $R^5$ may be identical to or different from each other.)

Examples of the unsubstituted monovalent hydrocarbon group represented by $R^4$ include those listed as the unsubstituted monovalent hydrocarbon group represented by $R^1$ in the general formula (1). A plurality of $R^4$ may be different from or identical to each other. The above $R^4$ is preferably the hydrogen atom, or the unsubstituted monovalent hydrocarbon group, more preferably the aliphatic hydrocarbon group having 1 to 18 carbon atoms, or the aromatic hydrocarbon group having 6 to 8 carbon atoms, and the hydrogen atom, a methyl group, a phenyl group are particularly suitable.

The number of carbon atoms in the alkylene group represented by the above $R^5$ is preferably 1 or more, and is preferably 18 or less, more preferably 8 or less. Examples of the alkylene group include a methylene group, ethylene group, trimethylene group, tetramethylene group, and pentamethylene group.

The above 'm' is preferably 2. The above 'n' is preferably 0 or more, more preferably 1 or more, and even more preferably 5 or more, and is preferably 600 or less, more preferably 400 or less, and even more preferably 250 or less.

The dynamic viscosity (25° C.) of the carbinol modified silicone oil is preferably 1 mm$^2$/s or more, more preferably 5 mm$^2$/s or more, and even more preferably 10 mm$^2$/s or more, and is preferably 200 mm$^2$/s or less, more preferably 100 mm$^2$/s or less, and even more preferably 50 mm$^2$/s or less. The dynamic viscosity of the silicone oil is measured by a viscosity measuring method using a capillary viscometer, prescribed in JIS Z 8803 (2011).

The hydroxy value of the carbinol modified silicone oil is preferably 1 mgKOH/g or more, more preferably 5 mgKOH/g or more, and even more preferably 10 mgKOH/g or more, and is preferably 200 mgKOH/g or less, more preferably 150 mgKOH/g or less, and even more preferably 130 mgKOH/g or less.

The carbinol modified silicone oil is commercially available, and examples thereof include X-22-4039, X-22-4015, KF-6000, KF-6001, KF-6002, KF-6003, X-22-170BX, and X-22-170DX (all of which are available from Shin-Etsu Chemical Co., Ltd.).

The amount of the carbinol modified silicone oil in the outermost layer paint is preferably 0.01 part by mass or more, more preferably 0.05 part by mass or more, and even more preferably 0.1 part by mass or more, and is preferably 20 parts by mass or less, more preferably 10 parts by mass or less, and even more preferably 8 parts by mass or less, with respect to 100 parts by mass of the total amount of the polyol and the polyisocyanate. If the amount falls within the above range, the flight distance on driver shots on a rainy day is further enhanced.

(Curable Silicone Resin)

The outermost layer paint may contain a curable silicone resin. The curable silicone resin has an alkoxysilyl group in the molecule, and is cured at normal temperature by the crosslinking of the alkoxysilyl group in the presence of the curing catalyst which will be described later. It is noted that the silicone resin is a silicone having a three-dimensional structure in the molecule.

Examples of the curable silicone resin include a condensate of a partially hydrolyzed product of an alkoxysilane compound represented by the general formula (3).

(In the formula (3), $R^6$ represents a hydrogen atom, or a substituted or unsubstituted monovalent hydrocarbon group, $R^7$ represents a substituted or unsubstituted monovalent hydrocarbon group, 'a' is an integer of 0 to 3, and a plurality of $R^6$ and $R^7$ may be identical to or different from each other.)

Examples of the unsubstituted monovalent hydrocarbon group represented by $R^6$ or $R^7$ include an aliphatic hydrocarbon group, and an aromatic hydrocarbon group. A plurality of $R^6$ and $R^7$ may be different from or identical to each other.

Examples of the aliphatic hydrocarbon group include an alkyl group. The number of carbon atoms in the alkyl group is preferably 1 or more, and is preferably 18 or less, more preferably 8 or less. The alkyl group may be linear, branched, or cyclic. Examples of the alkyl group include a linear alkyl group such as a methyl group, ethyl group, propyl group, butyl group, pentyl group, hexyl group, heptyl group, octyl group, nonyl group, decyl group, undecyl group, dodecyl group, tridecyl group, tetradecyl group, pentadecyl group, hexadecyl group, heptadecyl group, and octadecyl group; a branched alkyl group such as an isopropyl group, isobutyl group, sec-butyl group, tert-butyl group, isopentyl group, sec-pentyl group, neopentyl group, isooctyl group, 2-ethylhexyl group, and isodecyl group; and a cyclic alkyl group such as a cyclopropyl group, cyclobutyl group, cyclopentyl group, cyclohexyl group, cycloheptyl group, and cyclooctyl group.

Examples of the aromatic hydrocarbon group include an aryl group, an alkylaryl group, and an aralkyl group. The number of carbon atoms in the aromatic hydrocarbon group is preferably 6 or more, and is preferably 18 or less, more preferably 8 or less. Examples of the aryl group include a phenyl group. Examples of the alkylaryl group include a tolyl group and xylyl group. Examples of the aralkyl group include a benzyl group, 1-phenylethyl group, 2-phenylethyl group, and methylbenzyl group.

Examples of the substituted monovalent hydrocarbon group include a group in which at least one hydrogen atom of the unsubstituted monovalent hydrocarbon group is substituted with a substituent group. Examples of the substituent group include a halogen atom (e.g. fluorine, chlorine, bromine, iodine), a hydroxy group, a cyano group, an amino group and a carboxy group. Examples of the substituted monovalent hydrocarbon group include a halogenated alkyl group such as a 3,3,3-trifluoropropyl group.

The above $R^6$ is preferably the hydrogen atom, or the unsubstituted monovalent hydrocarbon group, more preferably the aliphatic hydrocarbon group having 1 to 18 carbon atoms, or the aromatic hydrocarbon group having 6 to 8 carbon atoms, and the hydrogen atom, a methyl group, a phenyl group are particularly suitable. The preferable curable silicone resin is a curable silicone resin only having a methyl group as $R^6$, or a curable silicone resin having a methyl group and phenyl group as $R^6$.

The above $R^7$ is preferably the unsubstituted monovalent hydrocarbon group, more preferably the aliphatic hydrocarbon group having 1 to 18 carbon atoms, and a methyl group, an ethyl group are particularly suitable.

The above 'a' is an integer of 0 to 3, and is preferably 1 or 2.

Examples of the alkoxysilane compound represented by the general formula (1) include methyltrimethoxy silane, methyltriethoxy silane, methyltriisopropoxy silane, methyltributoxy silane, ethyltrimethoxy silane, propyltrimethoxy silane, dimethyldimethoxy silane, phenyltrimethoxy silane, diphenyldimethoxy silane, phenylmethyldimethoxy silane, tetramethoxy silane, tetraethoxy silane, tetraisopropoxy silane, and tetrabutoxy silane. The alkoxysilane compound represented by the general formula (1) may be used solely, or at least two of them may be used in combination.

The condensate of the partially hydrolyzed product of the alkoxysilane compound is a substance obtained by adding water in the alkoxysilane compound and rising the temperature under stirring in the presence of a conventionally known catalyst to cause a partial hydrolysis and a condensation as well.

The dynamic viscosity (25° C.) of the curable silicone resin is preferably 0.1 mm$^2$/s or more, more preferably 0.5 mm$^2$/s or more, and even more preferably 1.0 mm$^2$/s or more, and is preferably 250 mm$^2$/s or less, more preferably 150 mm$^2$/s or less, and even more preferably 100 mm$^2$/s or less. The dynamic viscosity of the curable silicone resin is measured by a viscosity measuring method using a capillary viscometer, prescribed in JIS Z 8803 (2011).

The amount of the curable silicone resin in the outermost layer paint is preferably 20 parts by mass or less, more preferably 10 parts by mass or less, and even more preferably 5 parts by mass or less, with respect to 100 parts by mass of the total amount of the polyol and the polyisocyanate.

(Curing Catalyst)

The curing catalyst is not particularly limited as long as it is a catalyst capable of curing the curable silicone resin. Examples of the curing catalyst include an organic tin compound such as dibutyltin diacetate, dibutyltin dioctylate, and dibutyltin dilaurate; an organic aluminum compound such as aluminum tris(acetylacetone), aluminum tris(acetoacetate ethyl), and aluminum di isopropoxy(acetoacetate ethyl); an organic zirconium compound such as zirconium (acetylacetone), zirconium tris(acetylacetone), zirconium tetrakis(ethylene glycol monomethyl ether), zirconium tetrakis(ethylene glycol monoethyl ether), and zirconium tetrakis(ethylene glycol monobutyl ether); an organic titanium compound such as titanium tetrakis(ethylene glycol monomethyl ether), titanium tetrakis(ethylene glycol monoethyl ether), and titanium tetrakis(ethylene glycol monobutyl ether); a mineral acid such as hydrochloric acid, nitric acid, sulfuric acid, and phosphoric acid; an organic acid such as formic acid, acetic acid, oxalic acid, and trifluoroacetic acid; an inorganic alkaline such as ammonia, sodium hydroxide, and potassium hydroxide; an organic alkaline such as ethylene diamine, and alkanol amine; and an amino compound such as amino modified silicone, amino silane, silazane, and amines. Among them, preferable examples include the organic tin compound, the organic aluminum compound, the organic titanium compound, and the mineral acid.

The amount of the curing catalyst in the outermost layer paint is preferably 0.1 part by mass or more, more preferably 1 part by mass or more, and even more preferably 2 parts by mass or more, and is preferably 50 parts by mass or less, more preferably 20 parts by mass or less, and even more preferably 10 parts by mass or less, with respect to 100 parts by mass of the curable silicone resin.

(Reactive Silicone Oil)

The outermost layer paint may contain a reactive silicone oil other than the carbinol modified silicone. The reactive silicone oil is a silicone oil having a reactive group introduced to a part of silicon. The reactive silicone oil preferably has the reactive group at one or both terminals of the molecular chain. Examples of the reactive group include a hydrosilyl group (SiH), a silanol group (SiOH), and an alkoxysilyl group (SiOR (R is an alkyl group)).

The reactive silicone oil is preferably a reactive silicone oil represented by the general formula (4). In the reactive silicone oil, the silicon atom located at one terminal of the molecular chain of the polysiloxane constitutes the reactive group.

(4)

(In the formula (4), $R^8$ represents a substituted or unsubstituted monovalent hydrocarbon group, $R^9$ represents a hydrogen atom, a hydroxy group, or an alkoxy group, 'b' is an integer of 0 to 2, 'c' is an integer of 0 to 600, and a plurality of $R^8$ and $R^9$ may be identical to or different from each other.)

Examples of the unsubstituted monovalent hydrocarbon group represented by the above $R^8$ include an aliphatic hydrocarbon group, and an aromatic hydrocarbon group. A plurality of $R^8$ may be different from or identical to each other.

Examples of the aliphatic hydrocarbon group include an alkyl group. The number of carbon atoms in the alkyl group is preferably 1 or more, and is preferably 18 or less, more preferably 8 or less. The alkyl group may be linear, branched or cyclic. Examples of the alkyl group include a linear alkyl group such as a methyl group, ethyl group, propyl group, butyl group, pentyl group, hexyl group, heptyl group, octyl group, nonyl group, decyl group, undecyl group, dodecyl group, tridecyl group, tetradecyl group, pentadecyl group, hexadecyl group, heptadecyl group, and octadecyl group; a branched alkyl group such as an isopropyl group, isobutyl group, sec-butyl group, tert-butyl group, isopentyl group, sec-pentyl group, neopentyl group, isooctyl group, 2-ethylhexyl group, and isodecyl group; and a cyclic alkyl group such as a cyclopropyl group, cyclobutyl group, cyclopentyl group, cyclohexyl group, cycloheptyl group, and cyclooctyl group.

Examples of the aromatic hydrocarbon group include an aryl group, an alkylaryl group, and an aralkyl group. The number of carbon atoms in the aromatic hydrocarbon group is preferably 6 or more, and is preferably 18 or less, more preferably 8 or less. Examples of the aryl group include a phenyl group. Examples of the alkylaryl group include a tolyl group and xylyl group. Examples of the aralkyl group include a benzyl group, 1-phenylethyl group, 2-phenylethyl group, and methylbenzyl group.

Examples of the substituted monovalent hydrocarbon group include a group in which at least one hydrogen atom of the unsubstituted monovalent hydrocarbon group is substituted with a substituent group. Examples of the substituent group include a halogen atom (e.g. fluorine, chlorine, bromine, iodine). Examples of the substituted monovalent hydrocarbon group include a halogenated alkyl group such as a 3,3,3-trifluoropropyl group.

The above $R^8$ is preferably the hydrogen atom, or the unsubstituted monovalent hydrocarbon group, more preferably the aliphatic hydrocarbon group having 1 to 18 carbon atoms, or the aromatic hydrocarbon group having 6 to 8 carbon atoms, and the hydrogen atom, a methyl group, a phenyl group are particularly suitable.

$R^9$ represents a hydrogen atom, a hydroxy group, or an alkoxy group. The number of carbon atoms in the alkoxy group is preferably 1 or more, and is preferably 18 or less, more preferably 8 or less. Examples of the alkoxy group include a methoxy group, ethoxy group, propoxy group, isopropoxy group, butoxy group, isobutoxy group, and sec-butoxy group. Among them, $R^9$ is preferably the alkoxy group, more preferably the methoxy group or ethoxy group.

The above 'b' is preferably 2. The above 'c' is preferably 0 or more, more preferably 1 or more, and even more preferably 5 or more, and is preferably 600 or less, more preferably 400 or less, and even more preferably 250 or less.

The dynamic viscosity (25° C.) of the reactive silicone oil is preferably 0.65 mm²/s or more, more preferably 2 mm²/s or more, and even more preferably 5 mm²/s or more, and is preferably 1000 mm²/s or less, more preferably 500 mm²/s or less, and even more preferably 100 mm²/s or less. The dynamic viscosity of the reactive silicone oil is measured by a viscosity measuring method using a capillary viscometer, prescribed in JIS Z 8803 (2011).

The amount of the reactive silicone oil in the outermost layer paint is 10 parts by mass or less, more preferably 7 parts by mass or less, and even more preferably 5 parts by mass or less, with respect to 100 parts by mass of the total amount of the polyol and the polyisocyanate.

The amount of the reactive silicone oil in the outermost layer paint is preferably 5 parts by mass or more, more preferably 20 parts by mass or more, and even more preferably 50 parts by mass or more, and is preferably 200 parts by mass or less, more preferably 150 parts by mass or less, and even more preferably 75 parts by mass or less, with respect to 100 parts by mass of the curable silicone resin.

The paint may be either a waterborne paint mainly containing water as a dispersion medium or a solvent-based paint containing an organic solvent as a dispersion medium, and the solvent-based paint is preferable. In case of the solvent-based paint, preferable examples of the solvent include toluene, isopropyl alcohol, xylene, methyl ethyl ketone, methyl ethyl isobutyl ketone, ethylene glycol monomethyl ether, ethylbenzene, propylene glycol monomethyl ether, isobutyl alcohol, and ethyl acetate. It is noted that the solvent may be blended in either the polyol composition or the polyisocyanate composition. From the viewpoint of uniformly performing the curing reaction, the solvent is preferably blended in each of the polyol composition and the polyisocyanate composition.

A conventionally known catalyst can be employed in the curing reaction. Examples of the catalyst include a monoamine such as triethyl amine and N,N-dimethylcyclohexylamine; a polyamine such as N,N,N',N'-tetramethylethylene diamine and N,N,N',N",N"-pentamethyldiethylene triamine; a cyclic diamine such as 1,8-diazabicyclo[5.4.0]-7-undecene (DBU) and triethylene diamine; a tin catalyst such as dibutyl tin dilaurate and dibutyl tin diacetate. These catalysts may be used solely, or two or more of the catalysts may be used in combination. Among them, the tin catalyst such as dibutyl tin dilaurate and dibutyl tin diacetate is preferable, dibutyl tin dilaurate is particularly preferable.

Where necessary, the paint may further contain an additive generally contained in a golf ball paint, such as an ultraviolet absorber, an antioxidant, a light stabilizer, a fluorescent brightener, an anti-blocking agent, a leveling agent, a slip agent, and a viscosity modifier.

(Properties of the Outermost Layer of the Paint Film)

The thickness of the outermost layer of the paint film is preferably 2 μm or more, more preferably 4 μm or more, and even more preferably 6 μm or more, and is preferably 30 μm or less, more preferably 25 μm or less, and even more preferably 20 μm or less. If the thickness of the outermost layer of the paint film is 2 μm or more, the spin performance on approach shots is further enhanced, and if the thickness of the outermost layer of the paint film is 30 μm or less, increase in the spin rate on driver shots can be suppressed.

The water sliding angle of the surface of the outermost layer of the paint film is preferably 5° or more, more preferably 8° or more, and even more preferably 10° or more, and is preferably less than 50°, more preferably 45° or less, and even more preferably 40° or less. If the water sliding angle is 5° or more, the spin performance on approach shots is further enhanced, and if the water sliding angle is less than 50°, the flight distance on driver shots on a rainy day is further enhanced.

The water contacting angle of the surface of the outermost layer of the paint film is preferably 75° or more, more preferably 80° or more. If the water contact angle is 75° or more, the flight distance performance on driver shots on a rainy day is better. The upper limit of the water contact angle is not particularly limited, but it is preferably 120°. From the viewpoint of the stability of the flight performance, the outermost layer of the paint film of the golf ball preferably does not have a surface having the water contact angle of less than 70°. In other words, the outermost layer of the paint film of the golf ball preferably has the water contact angle of 70° or more at all the locations.

The dynamic friction coefficient of the outermost layer of the paint film is preferably 0.3 or more, more preferably 0.35 or more, and even more preferably 0.4 or more, and is preferably 0.9 or less, more preferably 0.85 or less, and even more preferably 0.8 or less. If the dynamic friction coefficient is 0.3 or more, the spin performance on approach shots is further enhanced, and if the dynamic friction coefficient is 0.9 or less, the flight distance on driver shots is further enhanced.

The properties of the outermost layer paint can also be evaluated by using a paint film formed on a baking plate. The method of forming the paint film on the baking plate will be described later. The water sliding angle of the paint film on the baking plate is preferably 2° or more, more preferably 4° or more, and even more preferably 6° or more, and is preferably 50° or less, more preferably 45° or less, and even more preferably 40° or less. The water contact angle of the paint film on the baking plate is preferably 100° or more, and is preferably 120° or less. It is noted that the baking plate prior to the formation of the paint film has a water sliding angle of more than 60° and a water contact angle of 95°.

In the case that the paint film has a multiple layered construction, examples of the base resin constituting the layer of the paint film other than the outermost layer of the paint film include a urethane resin, an epoxy resin, an acrylic resin, a vinyl acetate resin, and a polyester resin. Among them, the urethane resin is preferable. The layer of the paint film other than the outermost layer of the paint film may be formed from the same paint as that for forming the outermost layer of the paint film, or from the other paint.

(Forming of Paint Film)

The paint film can be formed by applying the paint on the surface of the golf ball body. The method of applying the paint is not particularly limited, and a conventionally known method, such as a spray coating method, and an electrostatic coating method, can be employed.

In case of spray coating using an air gun, the polyol composition and the polyisocyanate composition may be fed with respective pumps and continuously mixed with a line mixer located in the stream line just before the air gun, and the obtained mixture is subjected to spray coating. Alternatively, the polyol composition and the polyisocyanate composition may be subjected to spray coating separately by using an air spray system provided with a mixing ratio controlling device. The carbinol modified silicone oil is preferably blended in the polyol composition or the polyisocyanate composition in advance, more preferably blended in the polyol composition. The paint application may be conducted by spray coating one time or overspraying several times.

The paint applied to the golf ball body can be dried, for example, at a temperature of from 30° C. to 70° C. for 1 hour to 24 hours to form the paint film.

(Golf Ball Body)

The golf ball according to the present invention is not particularly limited, as long as it comprises a golf ball body and a paint film formed on a surface of the golf ball body and composed of at least one layer. The construction of the golf ball body is not particularly limited, and may be a one-piece golf ball, a two-piece golf ball, a three-piece golf ball, a four-piece golf ball, a multi-piece golf ball composed of five or more pieces, or a wound golf ball. The present invention can be applied appropriately to any one of the above golf ball bodies.

(Core)

A one-piece golf ball body, and a core used in a wound golf ball, two-piece golf ball to multi-piece golf ball will be explained.

The one-piece golf ball body and core can be formed from a conventional rubber composition (hereinafter sometimes simply referred to as "core rubber composition"). For example, the one-piece golf ball body and core can be molded by heat pressing a rubber composition containing a base rubber, a co-crosslinking agent and a crosslinking initiator.

As the base rubber, particularly preferred is a high-cis polybutadiene having a cis bond in an amount of 40 mass % or more, preferably 70 mass % or more, and more preferably 90 mass % or more in view of its superior resilience. As the co-crosslinking agent, an α,β-unsaturated carboxylic acid having 3 to 8 carbon atoms or a metal salt thereof is preferable, and a metal salt of acrylic acid or a metal salt of methacrylic acid is more preferable. As the metal constituting the metal salt, zinc, magnesium, calcium, aluminum or sodium is preferable, and zinc is more preferable. The amount of the co-crosslinking agent is preferably 20 parts by mass or more and 50 parts by mass or less with respect to 100 parts by mass of the base rubber. In a case that the α,β-unsaturated carboxylic acid having 3 to 8 carbon atoms is used as the co-crosslinking agent, a metal compound (e.g. magnesium oxide) is preferably added. As the crosslinking initiator, an organic peroxide is preferably used. Specific examples of the organic peroxide include dicumyl peroxide, 1,1-bis(t-butylperoxy)-3,3,5-trimethylcyclohexane, 2,5-dimethyl-2,5-di(t-butylperoxy) hexane, and di-t-butyl peroxide. Among them, dicumyl peroxide is preferably used. The amount of the crosslinking initiator is preferably 0.2 part by mass or more, more preferably 0.3 part by mass or more, and is preferably 3 parts by mass or less, more preferably 2 parts by mass or less, with respect to 100 parts by mass of the base rubber.

In addition, the core rubber composition may further contain an organic sulfur compound. As the organic sulfur compound, diphenyl disulfides (e.g. diphenyl disulfide, bis(pentabromophenyl) disulfide), thiophenols or thionaphthols (e.g. 2-thionaphthol) are preferably used. The amount of the organic sulfur compound is preferably 0.1 part by mass or more, more preferably 0.3 part by mass or more, and is preferably 5.0 parts by mass or less, more preferably 3.0 parts by mass or less, with respect to 100 parts by mass of the base rubber. The core rubber composition may further contain a carboxylic acid and/or a salt thereof. As the carboxylic acid and/or the salt thereof, a carboxylic acid having 1 to 30 carbon atoms and/or a salt thereof is preferable. The carboxylic acid may be either an aliphatic carboxylic acid or an aromatic carboxylic acid (such as benzoic acid). The amount of the carboxylic acid and/or the salt thereof is preferably 1 part by mass or more and 40 parts by mass or less with respect to 100 parts by mass of the base rubber.

The core rubber composition may further contain a weight adjusting agent such as zinc oxide and barium sulfate, an antioxidant, a colored powder, or the like in addition to the base rubber, the co-crosslinking agent, the crosslinking initiator, and the organic sulfur compound. The molding conditions for heat pressing the core rubber composition may be determined appropriately depending on the rubber composition. Generally, the heat pressing is preferably carried out at a temperature of 130° C. to 200° C. for 10 to 60 minutes, or carried out in a two-step heating of heating at a temperature of 130° C. to 150° C. for 20 to 40 minutes followed by heating at a temperature of 160° C. to 180° C. for 5 to 15 minutes.

(Cover)

The golf ball body preferably has a core and a cover covering the core. In this case, it is preferable that the slab hardness of the cover composition is appropriately set in accordance with the desired performance of the golf ball. For example, in case of a so-called distance golf ball which focuses on a flight distance, the cover composition preferably has a slab hardness of 50 or more, more preferably 55 or more, and even more preferably 60 or more in Shore D hardness, and preferably has a slab hardness of 80 or less, more preferably 70 or less, and even more preferably 68 or less in Shore D hardness. If the cover composition has a slab hardness of 50 or more, the obtained golf ball has a higher launch angle and lower spin rate on driver shots and long iron shots, and thus travels a greater flight distance. Further, if the cover composition has a slab hardness of 80 or less, the golf ball excellent in durability is obtained. In addition, in case of a so-called spin golf ball which focuses on controllability, the cover composition preferably has a slab hardness of less than 50 in Shore D hardness, and preferably has a slab hardness of 20 or more, more preferably 23 or more, and even more preferably 25 or more in Shore D hardness. If the cover composition has a slab hardness of less than 50 in Shore D hardness, the obtained golf ball readily stops on the green due to the high spin rate on approach shots. Further, if the cover composition has a slab hardness of 20 or more in Shore D hardness, the abrasion resistance becomes better. In case of a plurality of cover layers, the slab hardness of the cover composition constituting each layer may be identical to or different from each other, as long as the slab hardness of each cover composition falls within the above range.

In the case of the so-called distance golf ball which focuses on the flight distance, the thickness of the cover is preferably 0.3 mm or more, more preferably 0.5 mm or more, and even more preferably 0.7 mm or more, and is preferably 2.5 mm or less, more preferably 2.2 mm or less, and even more preferably 2.0 mm or less. If the thickness of the cover is 0.3 mm or more, the resilience of the golf ball can be maintained, and if the thickness of the cover is 2.5 mm or less, the golf ball has better shot feeling.

In the case of the so-called spin golf ball which focuses on controllability, the thickness of the cover is preferably 0.1 mm or more, more preferably 0.2 mm or more, and even more preferably 0.3 mm or more, and is preferably 2.0 mm or less, more preferably 1.5 mm or less, and even more preferably 1.0 mm or less. If the thickness of the cover is 0.1 mm or more, the golf ball has better shot feeling, and if the thickness of the cover is 2.0 mm or less, the resilience of the golf ball can be maintained.

The resin component constituting the cover is not particularly limited, and examples thereof include various resins such as an ionomer resin, a polyester resin, a urethane resin, and a polyamide resin; a thermoplastic polyamide elastomer having a trade name of "Pebax (registered trademark) (e.g. "Pebax 2533")" available from Arkema K. K.; a thermoplastic polyester elastomer having a trade name of "Hytrel (registered trademark) (e.g. "Hytrel 3548", "Hytrel 4047")" available from Du Pont-Toray Co., Ltd.; a thermoplastic polyurethane elastomer having a trade name of "Elastollan (registered trademark) (e.g. "Elastollan XNY97A")" available from BASF Japan Ltd.; and a thermoplastic styrene elastomer having a trade name of "Rabalon (registered trademark)" or a thermoplastic polyester based elastomer having a trade name of "Primalloy" available from Mitsubishi Chemical Corporation. The cover material may be used solely, or two or more of them may be used in combination. These cover materials may be used solely, or two or more of them may be used in combination.

Among them, the resin component constituting the cover is preferably the polyurethane resin in the case of the so-called spin golf ball which focuses on controllability, and is preferably the ionomer resin in the case of the so-called distance golf ball which focuses on the flight distance. In the case that the polyurethane resin is used in the resin component constituting the cover, the amount of the polyurethane resin in the resin component is preferably 50 mass % or more, more preferably 70 mass % or more, and even more preferably 90 mass % or more. In the case that the ionomer resin is used in the resin component constituting the cover, the amount of the ionomer resin in the resin component is preferably 50 mass % or more, more preferably 70 mass % or more, and even more preferably 90 mass % or more.

The polyurethane may be either a thermoplastic polyurethane or a thermosetting polyurethane. The thermoplastic polyurethane is a polyurethane exhibiting plasticity by heating and generally means a polyurethane having a linear chain structure of a high molecular weight to a certain extent. On the other hand, the thermosetting polyurethane (two-component curing type polyurethane) is a polyurethane obtained by polymerization through a reaction between a low molecular weight urethane prepolymer and a curing agent (chain extender) when molding the cover. The thermosetting polyurethane includes a polyurethane having a linear chain structure, or a polyurethane having a three-dimensional crosslinked structure depending on the number of the functional group of the prepolymer or curing agent (chain extender) to be used. The polyurethane is preferably the thermoplastic elastomer.

The cover may contain a pigment component such as a white pigment (e.g. titanium oxide), a blue pigment and a red pigment, a density adjusting agent such as calcium carbonate and barium sulfate, a dispersant, an antioxidant, an ultraviolet absorber, a light stabilizer, a fluorescent material or fluorescent brightener, or the like, in addition to the above resin component, as long as they do not impair the performance of the cover.

The embodiment for molding the cover from the cover composition is not particularly limited, and examples thereof include an embodiment comprising injection molding the cover composition directly onto the core; and an embodiment comprising molding the cover composition into hollow shells, covering the core with a plurality of the hollow shells and compression molding the core with a plurality of the hollow shells (preferably an embodiment comprising molding the cover composition into half hollow-shells, covering the core with two of the half hollow-shells and compression molding the core with two of the half hollow-shells). After the cover is molded, the obtained golf ball body is ejected from the mold, and as necessary, the golf ball body is preferably subjected to surface treatments such as deburring, cleaning, and sandblast. If desired, a mark may be formed.

The total number of dimples formed on the cover is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, a polygonal shape such as a roughly triangular shape, a roughly quadrangular shape, a roughly pentagonal shape, a roughly hexagonal shape, and other irregular shape. The shape of dimples is employed solely or at least two of them may be used in combination.

In the case that the golf ball is a three-piece golf ball, a four-piece golf ball, or a multi-piece golf ball comprising five or more pieces, examples of the material used for the intermediate layer disposed between the core and the outmost cover include a thermoplastic resin such as a polyurethane resin, an ionomer resin, a polyamide resin, and polyethylene; a thermoplastic elastomer such as a styrene elastomer, a polyolefin elastomer, a polyurethane elastomer, and a polyester elastomer; and a cured product of a rubber composition. Herein, examples of the ionomer resin include a product obtained by neutralizing, with a metal ion, at least a part of carboxyl groups in a copolymer composed of ethylene and an α,β-unsaturated carboxylic acid; and a product obtained by neutralizing, with a metal ion, at least a part of carboxyl groups in a terpolymer composed of ethylene, an α,β-unsaturated carboxylic acid and an α,β-unsaturated carboxylic acid ester. The intermediate layer may further contain a density adjusting agent such as barium sulfate and tungsten, an antioxidant, and a pigment. It is noted that the intermediate layer may be referred to as an inner cover layer or an outer core depending on the construction of the golf ball.

The golf ball preferably has a diameter in a range of from 40 mm to 45 mm. In light of satisfying a regulation of R&A (Royal and Ancient Golf Club of St Andrews), the diameter is preferably 42.67 mm or more. In light of prevention of air resistance, the diameter is preferably 44 mm or less, more preferably 42.80 mm or less. The golf ball preferably has a mass of 40 g or more and 50 g or less. In light of obtaining greater inertia, the mass is preferably 44 g or more, more preferably 45.00 g or more. In light of satisfying a regulation of R&A, the mass is preferably 45.93 g or less.

When the golf ball has a diameter in a range of from 40 mm to 45 mm, the compression deformation amount of the golf ball (shrinking amount of the golf ball along the compression direction) when applying a load from 98 N as an initial load to 1275 N as a final load to the golf ball is preferably 2.0 mm or more, more preferably 2.2 mm or more, and is preferably 5.0 mm or less, more preferably 4.5 mm or less. If the compression deformation amount is 2.0 mm or more, the golf ball does not become excessively hard, and thus the shot feeling thereof becomes better. On the other hand, if the compression deformation amount is 5.0 mm or less, the resilience of the golf ball becomes higher.

The FIGURE is a partially cutaway sectional view showing a golf ball 1 according to an embodiment of the present invention. The golf ball 1 comprises a spherical core 2, an intermediate layer 3 covering the spherical core 2, a cover 4 covering the intermediate layer 3, and a paint film 5 formed on the surface of the cover 4. A plurality of dimples 41 are formed on the surface of the cover 4. Other portion than the dimples 41 on the surface of the cover 4 is a land 42. The paint film 5 is formed from the paint containing the polyisocyanate composition, the polyol composition, and the silicone compound.

EXAMPLES

Next, the present invention will be described in detail by way of examples. However, the present invention is not limited to the examples described below. Various changes and modifications without departing from the spirit of the present invention are included in the scope of the present invention.
[Evaluation Method]
(1) Hardness of Core (Shore C Hardness)

The hardness measured at the surface portion of the core was adopted as the surface hardness of the core. Further, the core was cut into two hemispheres to obtain a cut plane, and the hardness measured at the central point of the cut plane was adopted as the center hardness of the core. The hardness was measured with an automatic hardness tester (Digitest II available from Bareiss company) using a detector of "Shore C".
(2) Slab Hardness (Shore D Hardness)

Sheets with a thickness of about 2 mm were produced by injection molding the intermediate layer composition or cover composition. The sheets were stored at 23° C. for two weeks. At least three of these sheets were stacked on one another so as not to be affected by the measuring substrate on which the sheets were placed, and the hardness of the stack was measured with an automatic hardness tester (Digitest II available from Bareiss company) using a detector of "Shore D".
(3) Compression Deformation Amount (mm)

The deformation amount of the core along the compression direction (shrinking amount of the core along the compression direction), when applying a load from 98 N as an initial load to 1275 N as a final load to the core, was measured.
(4) Baking Plate As a material for a test piece for forming a paint film, a steel plate SPCC prescribed in JIS G 4314 was used, and the test piece has a shape of a thickness of 0.8 mm, a width of 70 mm, and a length of 150 mm. A primer surfacer was spray coated on both surfaces of the test piece, and dried. Subsequently, the test piece was polished using water with a water-resistant polishing paper (#P400) until the surface thereof became smooth, and then washed with a detergent and water, and dried. Then, an acrylic melamine resin enamel was spray coated, kept at normal temperature for 20 minutes, and compulsorily dried at a temperature of 160° C. for 20 minutes, to prepare a baking plate.

The paint film was formed on the obtained baking plate under the same conditions as those in the production of the golf ball, and the water sliding angle of the surface of the paint film was measured.

(5) Thickness of Paint Film

The surface of the golf ball was cut with a slicer, and the thickness of the paint film was measured with a microscope.

(6) Water Sliding Angle

The water sliding angle was measured with a sliding contact angle meter (DMo-501SA available from Kyowa Interface Science Co., Ltd.). The measuring conditions were as follows. In the measurement of the golf ball, water was dropped at the central point of the dimple having the largest diameter.

Measuring method: sliding method

Analysis method: roundness fitting method (section 60 dots)

Field: WIDE1

Water amount: 19±1 μL (needle used: stainless steel needle 15 G)

Sliding condition: 0 to 90° (2.0° per second, continuous inclination)

Determination distance of sliding and moving: inclination angle when moving at least 3 dots (7) Water Contact Angle The water contact angle was measured with a contact angle meter (DropMaster DM501, analysis software (FAMAS), available from Kyowa Interface Science Co., Ltd.). As a glass syringe barrel for the water dropping, a syringe barrel set 22 G available from Kyowa Interface Science Co., Ltd. was used.

The measurement was conducted as follows. Firstly, the software was started, and the syringe barrel was set in the contact angle meter. Subsequently, the test sample was set on a sample table such that the portion of the monitor having water dropped thereon was horizontal. Then, 2 μL of water was dropped from the syringe barrel, and the contact angle 30 second later after the dropping was measured. It is noted that the contact angle was measured by θ/2 method. In the measurement of the golf ball, water was dropped at the central point of the dimple having the largest diameter.

(8) Dynamic Friction Coefficient

The dynamic friction coefficient of the golf ball was measured under the following conditions. It is noted that the load is small and the moving speed is slow in the following condition, thus the dynamic friction coefficient of the outermost layer of the paint film can be measured.

Tester: TriboMaster TL201TS (available from Trinity-Lab. Inc.)

Test sample: golf ball

Face plate: stainless steel (HT1770 (size: 50 mm×150 mm×thickness 2 mm) available from Nippon Steel Nisshin Co. Ltd.) having a face surface with an arithmetic average roughness Ra of 2.9 μm and an average value of maximum height Ry of 21.7 μm, was used.

Preparing method of face plate: the face plate was obtained by performing an air blast treatment to the stainless steel. A mixture of an alumina powder (#60) and STEEL BALL (ES300 available from Ervin industries Co.) in a ratio of 1:1 was used as an abrasive, and the blast conditions were a distance of 10 cm between the face plate and the nozzle, and a press of 4 to 6 kg/cm² just before the nozzle.

Measuring method of Ra and Ry: Ra and Ry were measured with a surface roughness tester (SJ-301 available from Mitutoyo Corporation) by a method according to JIS B 0601-1994. Ra and Ry were an average value of values measured at six points, respectively. The cutoff value λc was 2.5 mm.

Temperature: 23° C.

Ball moving speed: 2 mm/s

Load: 1.96 N (200 gf)

Measuring method: dynamic friction force was measured by fixing the ball with a chuck, and moving the ball on a flat plate at a certain speed while applying a load of 200 gf to the ball.

Measuring item: dynamic friction (average value of 2-10 mm section)

(9) Driver Shot

A driver (trade name: "SRIXON Z765", shaft hardness: X, loft angle: 8.5°, available from Sumitomo Rubber Industries, Ltd.) was installed on a swing machine available from Golf Laboratories, Inc. The golf ball was hit at a head speed of 50 m/sec, and the spin rate and carry thereof were measured. The carry was a distance from the launch point to the stop point. The spin rate (rpm) was measured by continuously taking a sequence of photographs of the hit golf ball. The average value of ten measurements was obtained. The club face and ball were wetted, and the measurement was conducted on a rainy day.

(10) Long Iron Shot

A #5 iron (trade name: "SRIXON Z765", shaft hardness: S, loft angle: 25°, available from Sumitomo Rubber Industries, Ltd.) was installed on a swing machine available from Golf Laboratories, Inc. The golf ball was hit at a head speed of 41 m/sec, and the spin rate and carry thereof were measured. The carry was a distance from the launch point to the stop point. The spin rate (rpm) was measured by continuously taking a sequence of photographs of the hit golf ball. The average value of ten measurements was obtained. The club face and ball were wetted, and the measurement was conducted on a rainy day.

(11) Approach Shot

A sand wedge (RTX-3 BLD, loft angle: 58° available from Cleveland Golf) was installed on a swing robot available from Golf Laboratories, Inc. The golf ball was hit at a head speed of 16 m/sec, and the spin rate (rpm) thereof was measured by continuously taking a sequence of photographs of the hit golf ball. The measurement was conducted ten times for each golf ball, and the average value thereof was adopted as the spin rate. The club face and ball were wetted, and the measurement was conducted on a rainy day.

[Production of Golf Balls]

1. Production of Spherical Cores

According to the formulation shown in Table 1, the rubber composition was kneaded, and heat pressed in upper and lower molds, each having a hemispherical cavity, at a temperature of 150° C. for 19 minutes to obtain a spherical core having a diameter of 39.7 mm. It is noted that the amount of barium sulfate was adjusted such that the ball had a mass of 45.6 g.

TABLE 1

| Spherical core | | |
|---|---|---|
| Formulation of rubber composition (parts by mass) | Polybutadiene rubber | 100 |
| | Zinc acrylate | 30.5 |
| | Zinc oxide | 10 |
| | Barium sulfate | Appropriate amount |
| | Bis(pentabromophenyl)disulfide | 0.3 |
| | Dicumyl peroxide | 0.7 |
| | Benzoic acid | 2 |
| Molding condition | Temperature (° C.) | 150 |
| | Time (min) | 19 |
| Core property | Compression deformation amount (mm) | 3.3 |
| | Center hardness (Shore C) | 53 |
| | Surface hardness (Shore C) | 80 |

TABLE 1-continued

| Spherical core | |
|---|---|
| Hardness difference (surface - center) (Shore C) | 27 |

Polybutadiene rubber: "BR730 (high-cis polybutadiene)" available from JSR Corporation
Zinc acrylate: "ZN-DA90S" available from Nisshoku Techno Fine Chemical Co., Ltd.
Zinc oxide: Ginrei R" available from Toho Zinc Co., Ltd.
Barium sulfate: "Barium Sulfate BD" available from Sakai Chemical Industry Co., Ltd.
Bis(pentabromophenyl) disulfide: available from Kawaguchi Chemical Industry Co., Ltd.
Dicumyl peroxide: "Percumyl (registered trademark) D" available from NOF Corporation
Benzoic acid: available from Emerald Kalama Chemical Corporation 2. Preparation of Intermediate Layer Composition and Cover Composition According to the formulations shown in Tables 2 and 3, the materials were mixed with a twin-screw kneading extruder to prepare the intermediate layer composition and the cover composition in a pellet form. The extruding conditions were a screw diameter of 45 mm, a screw rotational speed of 200 rpm, and a screw L/D=35, and the mixture was heated to 160° C. to 230° C. at the die position of the extruder.

TABLE 2

| Intermediate layer composition | |
|---|---|
| Himilan AM7329 | 55 |
| Himilan 1555 | 45 |
| Barium sulfate | Appropriate amount |
| Titanium dioxide | 3 |
| Slab hardness (Shore D) | 62 |

Himilan (registered trademark) AM7329: zinc ion-neutralized ethylene-methacrylic acid copolymer ionomer resin available from Du Pont-Mitsui Polychemicals Co., Ltd.
Himilan 1555: Sodium ion-neutralized ethylene-methacrylic acid copolymer ionomer resin available from Du Pont-Mitsui Polychemicals Co., Ltd.

TABLE 3

| Cover composition | |
|---|---|
| Elastollan NY80A | 100 |
| Titanium dioxide | 4 |
| Ultramarine blue | 0.04 |
| Slab hardness (Shore D) | 27 |

Elastollan (registered trademark) NY80A: thermoplastic polyurethane elastomer available from BASF Japan Ltd.

3. Molding of Intermediate Layer

The above obtained intermediate layer composition was directly injection molded on the above obtained spherical core, to form the intermediate layer (thickness: 1.0 mm) covering the spherical core.

4. Preparation of Reinforcing Layer

A reinforcing layer composition (trade name "Polin (registered trademark) 750LE" available from Shinto Paint Co. Ltd.) having a two-component curing type epoxy resin as a base resin was prepared. The base material contains 30 parts by mass of a bisphenol A type solid epoxy resin and 70 parts by mass of a solvent. The curing agent contains 40 parts by mass of a modified polyamide amine, 5 parts by mass of titanium dioxide and 55 parts by mass of a solvent. The mass ratio of the base material to the curing agent was 1/1. The reinforcing layer composition was applied to the surface of the intermediate layer with an air gun and kept at an atmosphere of 23° C. for 12 hours, to form the reinforcing layer. The reinforcing layer had a thickness of 7 μm.

5. Molding of Cover

The cover composition in a pellet form was charged into each of the depressed part of the lower mold of a half shell molding mold, and applying a pressure to mold half shells. The spherical body having the reinforcing layer formed thereon was concentrically covered with two of the half shells. The spherical body and half shells were charged into a final mold provided with a plurality of pimples on the cavity surface. The cover (thickness: 0.5 mm) was formed by compression molding, and the golf ball bodies were obtained. A plurality of dimples having an inverted shape of the pimples were formed on the cover.

6. Formation of Paint Film (1) Preparation of Polyol Composition

As the first polyol component, polytetramethylene ether glycol (PTMG, number average molecular weight: 650) and trimethylolpropane (TMP) were dissolved in a solvent (toluene and methyl ethyl ketone). It is noted that the molar ratio (TMP:PTMG) of TMP to PTMG was 1.87:1. Dibutyltin dilaurate was added as a catalyst therein in an amount of 0.1 mass % with respect to the total amount of the base material. While keeping the temperature of the obtained polyol solution at 80° C., isophorone diisocyanate (IPDI) as the first polyisocyanate component was added dropwise to the polyol solution and mixed. It is noted that the molar ratio (NCO/OH) of the NCO group included in the first polyisocyanate component to the OH group included in the first polyol component was 0.6. After the dropwise adding, stirring was continued until the isocyanate group no longer existed. Then, the reaction liquid was cooled to the normal temperature to prepare the polyol composition containing the urethane polyol (urethane polyol amount: 30 mass %). The obtained urethane polyol had PTMG in an amount of 46.2 mass %, a hydroxyl value of 128.0 mgKOH/g, and a weight average molecular weight of 7200.

(2) Preparation of Polyisocyanate Composition 30 parts by mass of a biuret product of hexamethylene diisocyanate (Duranate (registered trademark) 21S-75E (NCO amount: 15.5%) available from Asahi Kasei Chemicals Corporation), 30 parts by mass of an isocyanurate product of hexamethylene diisocyanate (Duranate TKA-100 (NCO amount: 21.7%) available from Asahi Kasei Chemicals Corporation), and 40 parts by mass of an isocyanurate product of isophorone diisocyanate (VESTANAT (registered trademark) T1890 (NCO amount: 12.0%) available from Degussa) were mixed to prepare the polyisocyanate composition.

(3) Preparation of Paint

The materials shown in Table 4 were blended to prepare the paint compositions No. 1 to No. 6. It is noted that the blending ratio of the polyisocyanate composition to the polyol composition was adjusted such as the molar ratio (NCO/OH) of the NCO group in the polyisocyanate composition to the OH group in the polyol composition was 1.2/1.0.

TABLE 4

| | Paint No. | 1 | 2 | 3 | 4 | 5 | 6 |
|---|---|---|---|---|---|---|---|
| Formulation (parts by mass) | Total amount of polyisocyanate composition and polyol composition | 100 | 100 | 100 | 100 | 100 | 100 |
| | Carbinol modified silicone oil No.1 | 5 | — | — | — | — | — |
| | Carbinol modified silicone oil No.2 | — | 3 | — | 1 | — | — |
| | Carbinol modified silicone oil No.3 | — | — | 1 | 1 | — | — |
| | Carboxy modified silicone oil | — | — | — | — | 3 | — |

TABLE 4-continued

| Paint No. | | 1 | 2 | 3 | 4 | 5 | 6 |
|---|---|---|---|---|---|---|---|
| Evaluation | Water sliding angle (baking plate) (°) | 41 | 35 | 25 | 27 | More than 60 | More than 60 |

Carbinol modified silicone oil No.1: X-22-4039 (dynamic viscosity (25° C.): 90 mm²/s, hydroxy value: 58 mgKOH/g, silicone oil having a carbinol group introduced to a silicon atom located at a site other than a terminal of a polysiloxane molecular chain) available from Shin-Etsu Chemical Co., Ltd.
Carbinol modified silicone oil No. 2: KF-6000 (dynamic viscosity (25° C.): 35 mm²/s, hydroxy value: 120 mgKOH/g, carbinol modified silicone oil represented by the formula (1) ($R^1$: substituted or unsubstituted monovalent hydrocarbon group, $R^2$: alkylene group, $R^3$: alkylene group, x: an integer of 2, y: an integer of 2, z: 0 to 600)) available from Shin-Etsu Chemical Co., Ltd.
Carbinol modified silicone oil No. 3: X-22-170BX (dynamic viscosity (25° C.): 40 mm²/s, hydroxy value: 20 mgKOH/g, carbinol modified silicone oil represented by the formula (2) ($R^4$: substituted or unsubstituted monovalent hydrocarbon group, $R^5$: alkylene group, m: an integer of 2, z: 0 to 600)) available from Shin-Etsu Chemical Co., Ltd.
Carboxy modified silicone oil: X-22-162C (dynamic viscosity (25° C.): 220 mm²/s, functional group equivalent: 2300 g/mol, silicone oil having a carboxy group introduced to a silicon atom located at both terminals of a polysiloxane molecular chain) available from Shin-Etsu Chemical Co., Ltd.

7. Formation of Paint Film

The surface of the obtained golf ball bodies was subjected to a sandblast treatment, and a mark was formed thereon. The paint was applied with a spray gun, and dried in an oven of 40° C. for 24 hours, to obtain golf balls with a diameter of 42.7 mm and a mass of 45.6 g. The application of the paint was conducted by placing the golf ball body in a rotating member provided with a prong, rotating the rotating member at 300 rpm, and spacing a spray distance (7 cm) between the air gun and the golf ball body while moving the air gun in an up and down direction. The painting interval in the overpainting operation was 1.0 second. The application of the paint was conducted under the air gun spraying conditions of overpainting: twice, a spraying air pressure: 0.15 MPa, a compressed air tank pressure: 0.10 MPa, a painting time for one application: 1 second, an atmosphere temperature: 20° C. to 27° C., and an atmosphere humidity: 65% or less. Evaluation results regarding the obtained golf balls are shown in Table 5.

This application is based on Japanese patent applications No. 2019-086325 and No. 2019-086326, both filed on Apr. 26, 2019, the contents of which are hereby incorporated by reference.

The invention claimed is:

1. A golf ball comprising a golf ball body and a paint film covering the golf ball body and composed of at least one layer, wherein
an outermost layer of the paint film is formed from a paint containing a polyol, a polyisocyanate, and a carbinol modified silicone oil, and
the carbinol modified silicone oil amount is from 0.1 parts by mass to 20 parts by mass with respect to 100 parts by mass of a total amount of the polyol and the polyisocyanate, and
the carbinol modified silicone oil is a silicone oil represented by formula (1):

wherein in the formula (1),
$R^1$ represents a substituted or unsubstituted monovalent hydrocarbon group,
$R^2$ represents an alkylene group,
$R^3$ represents an alkylene group,
'x' is an integer of 0 to 3,
'y' is an integer of 0 to 2,
'z' is an integer of 0 to 600, and
a plurality of $R^1$ to $R^3$ may be identical to or different from each other.

2. The golf ball according to claim 1, wherein the carbinol modified silicone oil has a carbinol group at both terminals of a molecular chain thereof.

TABLE 5

| | Golf ball No. | 1 | 2 | 3 | 4 | 5 | 6 |
|---|---|---|---|---|---|---|---|
| Paint film | Paint No. | 1 | 2 | 3 | 4 | 5 | 6 |
| | Thickness (μm) | 10 | 10 | 10 | 10 | 10 | 10 |
| | Water sliding angle (°) | 44 | 41 | 30 | 34 | More than 60 | More than 60 |
| | Dynamic friction coefficient | 0.50 | 0.49 | 0.48 | 0.47 | 0.55 | 0.55 |
| | Water contact angle (°) | 80 | 82 | 92 | 88 | 64 | 62 |
| Evaluation | Flight distance on driver shots on rainy day (yd) | 234.0 | 234.5 | 238.0 | 236.5 | 223.5 | 223.0 |
| | Flight distance on long iron shots on rainy day (yd) | 186.5 | 187.5 | 188.5 | 188.0 | 182.5 | 182.0 |
| | Spin rate on approach shots on rainy day (rpm) | 2720 | 2850 | 3000 | 2930 | 2420 | 2400 |

The golf balls No. 1 to 4 are the cases that the outermost layer of the paint film is formed from the paint containing the polyol, the polyisocyanate, and the carbinol modified silicone oil. Each of these golf balls travels a great flight distance on driver shots on a rainy day, and has a high spin rate on approach shots on a rainy day.
The golf ball No. 5 is the case that the outermost layer of the paint film is formed from the paint containing the polyol, the polyisocyanate, and the carboxy modified silicone oil. The golf ball No. 6 is the case that the outermost layer of the paint film is formed from the paint not containing the silicone oil. Each of these golf balls travels a short flight distance on driver shots on a rainy day, and has a low spin rate on approach shots on a rainy day.

3. The golf ball according to claim 1, wherein d the silicone oil represented by formula (1) is a silicone oil represented by formula (2):

wherein in the formula (2),
$R^4$ represents a substituted or unsubstituted monovalent hydrocarbon group,
$R^5$ represents an alkylene group,
'm' is an integer of 0 to 2,
'n' is an integer of 0 to 600, and
a plurality of $R^4$ and $R^5$ may be identical to or different from each other.

4. The golf ball according to claim 1, wherein the carbinol modified silicone oil has a hydroxy value of from 1 mgKOH/g to 200 mgKOH/g.

5. The golf ball according to claim 1, wherein the polyol contains a urethane polyol.

6. The golf ball according to claim 5, wherein the urethane polyol has a weight average molecular weight of from 5000 to 20000.

7. The golf ball according to claim 5, wherein the urethane polyol has a hydroxy value of from 10 mgKOH/g to 200 mgKOH/g.

8. The golf ball according to claim 5, wherein
the urethane polyol is a reaction product obtained by a reaction between a first polyol component and a first polyisocyanate component,
and the first polyol component contains a polyether diol having a number average molecular weight of from 500 to 4000.

9. The golf ball according to claim 1, wherein the polyol contains a polyrotaxane, and the polyrotaxane has a cyclic molecule having at least one hydroxy group, and a linear molecule piercing through a ring of the cyclic molecule so that the cyclic molecule is movable along and rotatable around the linear molecule.

10. The golf ball according to claim 1, wherein a molar ratio (NCO group/OH group) of an isocyanate group (NCO group) included in the polyisocyanate to a hydroxyl group (OH group) included in the polyol is in a range of from 0.1 to 1.5.

11. The golf ball according to claim 1, wherein the outermost layer of the paint film has a surface having a water sliding angle of less than 50°.

12. The golf ball according to claim 1, wherein the outermost layer of the paint film has a surface having a dynamic friction coefficient of from 0.3 to 0.9.

13. The golf ball according to claim 1, wherein the outermost layer of the paint film has a surface having a water contact angle of 75° or more.

14. The golf ball according to claim 1, wherein the outermost layer of the paint film has a thickness of from 2 μm to 30 μm.

15. The golf ball according to claim 1, wherein
the outermost layer of the paint film has a thickness of from 2 μm to 30 μm,
the outermost layer of the paint film has a surface having a water sliding angle of less than 50°, and
the outermost layer of the paint film has a surface having a dynamic friction coefficient of from 0.3 to 0.9.

16. The golf ball according to claim 1, wherein the silicone oil represented by formula (1) is a silicone oil represented by formula (2):

wherein in the formula (2),
$R^4$ represents a substituted or unsubstituted monovalent hydrocarbon group,
$R^5$ represents an alkylene group,
'm' is an integer of 0 to 2,
'n' is an integer of 0 to 600, and
a plurality of $R^4$ and $R^5$ may be identical to or different from each other, and wherein the carbinol modified silicone oil has a hydroxy value of from 1 mgKOH/g to 200 mgKOH/g.

17. The golf ball according to claim 16, wherein the polyol contains a urethane polyol, and the urethane polyol has a weight average molecular weight of from 5000 to 20000 and a hydroxy value of from 10 mgKOH/g to 200 mgKOH/g.

18. The golf ball according to claim 17, wherein
the outermost layer of the paint film has a thickness of from 2 μm to 30 and
the outermost layer of the paint film has a surface having a water sliding angle of less than 50° and a surface having a dynamic friction coefficient of from 0.3 to 0.9.

19. The golf ball according to claim 1, wherein the carbinol modified silicone oil amount is from 1 part by mass to 20 parts by mass with respect to 100 parts by mass of a total amount of the polyol and the polyisocyanate.

* * * * *